(12) United States Patent
Yang (10) Patent No.: US 7,267,245 B2
(45) Date of Patent: Sep. 11, 2007

(54) BITE VALVE

(76) Inventor: Shih-Sheng Yang, P.O. Box No. 6-57, Junghe, Taipei 235 (TW)

( * ) Notice: Subject to any disclaimer, the term of this patent is extended or adjusted under 35 U.S.C. 154(b) by 508 days.

(21) Appl. No.: 10/834,904

(22) Filed: Apr. 30, 2004

(65) Prior Publication Data

US 2005/0242130 A1 Nov. 3, 2005

(51) Int. Cl.
*B65D 5/72* (2006.01)
(52) U.S. Cl. ............ 220/703; 222/494; 222/566; 222/490; 239/33; 251/342; 220/714; 220/715
(58) Field of Classification Search ........... 222/490, 222/494, 175, 529, 527, 547, 566, 564; 239/24, 239/33; 220/703, 714, 715; 251/342–344, 251/358
See application file for complete search history.

(56) References Cited

U.S. PATENT DOCUMENTS

| | | | |
|---|---|---|---|
| 5,601,207 A * | 2/1997 | Paczonay | 220/703 |
| 5,791,510 A * | 8/1998 | Paczonay | 220/714 |
| 6,032,831 A * | 3/2000 | Gardner et al. | 222/175 |
| 6,039,305 A * | 3/2000 | Hoskins et al. | 251/342 |
| 6,062,435 A * | 5/2000 | Hess, III | 222/175 |
| 6,273,128 B1 * | 8/2001 | Paczonay | 137/512.3 |
| 6,279,772 B1 * | 8/2001 | Bowman | 220/703 |
| 6,364,168 B1 * | 4/2002 | Gardner et al. | 222/175 |
| 7,028,929 B2 * | 4/2006 | Yang | 239/597 |
| 2004/0159820 A1 * | 8/2004 | Yang | 251/342 |

* cited by examiner

*Primary Examiner*—Frederick C. Nicolas
(74) *Attorney, Agent, or Firm*—Troxell Law Office, PLLC (57) ABSTRACT

A bite valve manufactured from a soft and flexible material includes a joining section, a liquid outlet section, and at least a pair of columns at an inner wall approaching the liquid outlet section to retain the bite valve and to prevent an inner channel of the bite valve from being closed, and an extension tube projecting from an outer periphery of the liquid outlet section and being capable of bending backward to accommodate around the outer periphery of the liquid outlet section. Wherein, the joining section is for joining with a liquid guide tube of a liquid container.

13 Claims, 9 Drawing Sheets

BITE VALVE

BACKGROUND OF THE INVENTION (a) Field of the Invention

The invention relates to a bite valve, and more particularly, to a flexible bite valve having an enhanced open state, such that when a liquid outlet section thereof receives forces, an open width of the liquid outlet is larger and a liquid outlet slit can be transversely expanded with an optimal breadth to facilitate dispensing of a liquid. When the forces applied are dismissed, the liquid outlet slit offers highly intensive closure effects for accomplishing sealing functions. The invention is suitable for applications of liquid containers used during outdoor sports.

(b) Description of the Prior Art

To fulfill water intake needs of athletes especially bikers and climbers under all circumstances during outdoor sports, liquid containers having a bite valve were designed and extensively used.

Referring to prior flexible bite valves of liquid container disclosed by the U.S. Pat. Nos. 5,601,207, 5,730,336, 5,791,510, 6,032,831 and 6,070,767, a flexible plastic bite valve has a front end portion provided with a liquid outlet, and a front portion of a mouthpiece devised with a linear or a cross-shaped liquid slit. The narrow liquid slit is constantly closed to prevent a liquid from seeping through using natural restoring elasticity of a surrounding plastic material that presses against sidewalls of the liquid slit.

Figure 10:
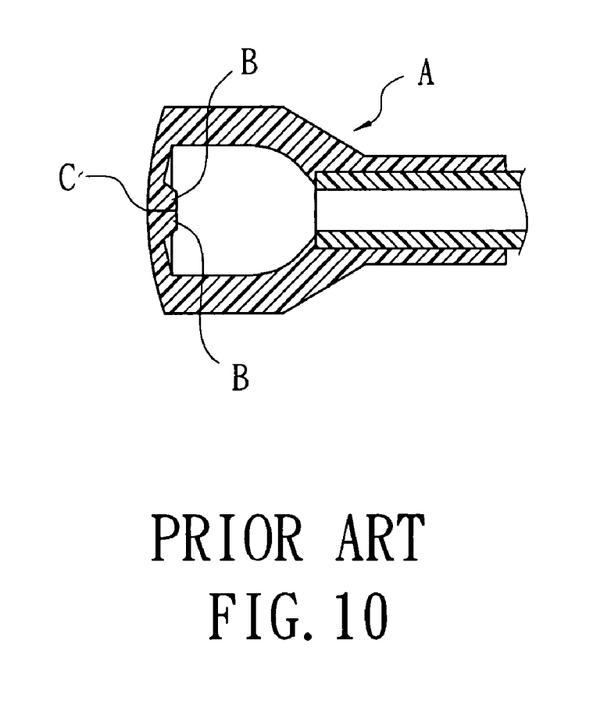
FIG. 10 shows a top view of a prior bite valve.

When the aforesaid bite valve is held by one's teeth, the lips of the opening of the liquid slit are everted for being compressed. Referring to FIG. 10 showing a sectional view illustrating a motion of a bite valve A of U.S. Pat. No. 6,032,831, the bite valve A has raised lips B at two sides of a central liquid slit C at a liquid outlet thereof. Thus, the liquid slit C is allowed with good sealing and liquid stoppage effects since plate bodies of the lips B are provided with greater restoring elasticity.

Figure 11:
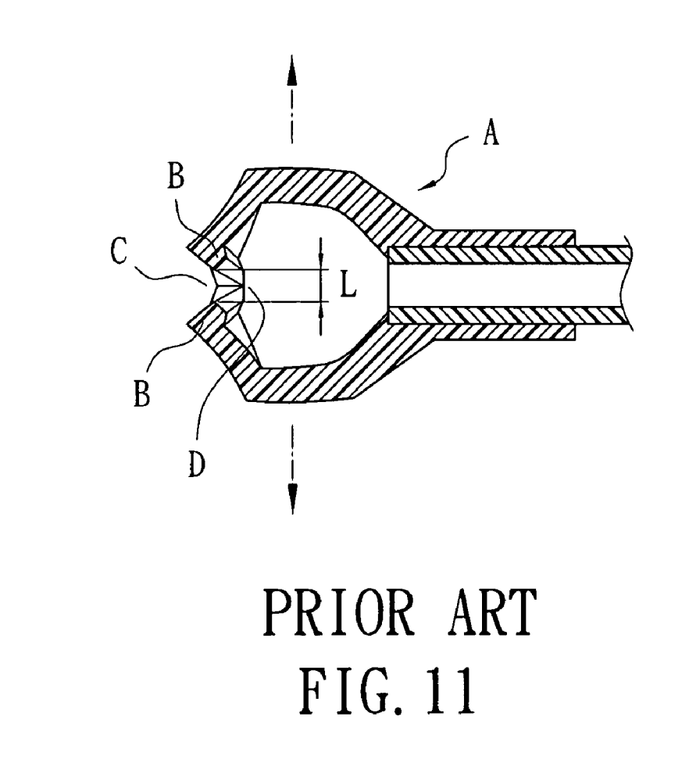
FIG. 11 shows a top view of a prior bite valve in use.

When the bite valve A receives vertical forces as shown in FIG. 11, the liquid slit C is compressed by the plate bodies and is everted as one's lips. For a breadth L of an open channel at an innermost section, an extended breadth is inevitably restricted because roots D of the plate bodies of the lips are joined. As a result, more effort is necessarily applied when sucking out the liquid contained in the liquid container. Therefore, it is a vital task of the invention as how to provide a flexible bite valve having a liquid outlet with a larger opening, and enlarged equal upper and lower widths with an enhanced open status.

SUMMARY OF THE INVENTION

The primary object of the invention is to provide a bite valve that enables a liquid contained in a liquid container to be more easily dispensed, thereby allowing a user to acquire the liquid in the liquid container with minimal effort during sports.

The secondary object of the invention is to provide a bite valve having an enhance open status when a liquid outlet slit thereof is compressed and a larger extended width of the liquid outlet slit thereof as well as offering greater tightening forces.

To accomplish the aforesaid objects, a bite valve according to the invention is manufactured from a soft and flexible material, and comprises a joining section and a liquid outlet section. The bite valve also has at least a pair of columns at an inner wall approaching the liquid outlet section, so as to prevent an inner channel from being closed when the bite valve is held between one's teeth. In addition, the columns also enable a plate body at two sides of a liquid outlet slit of the liquid outlet section to horizontally displace, such that upper and lower widths of the liquid outlet slit opened are even further expanded. The bite value further has an extension tube projecting from an outer periphery of the liquid outlet section, with the extension tube being capable of bending inward to accommodate around the outer periphery of the liquid outlet section, thereby tightly shutting the liquid outlet slit of the liquid outlet section. The joining section is provided with an inner screw thread at an interior thereof, so as to facilitate dispensing a liquid contained in a liquid container when the bite valve is joined with a liquid guide tube of the liquid container using the joining section thereof.

DETAILED DESCRIPTION OF THE PREFERRED EMBODIMENTS

To better understand the invention, detailed descriptions shall be given with the accompanying drawings below.

Figure 1:
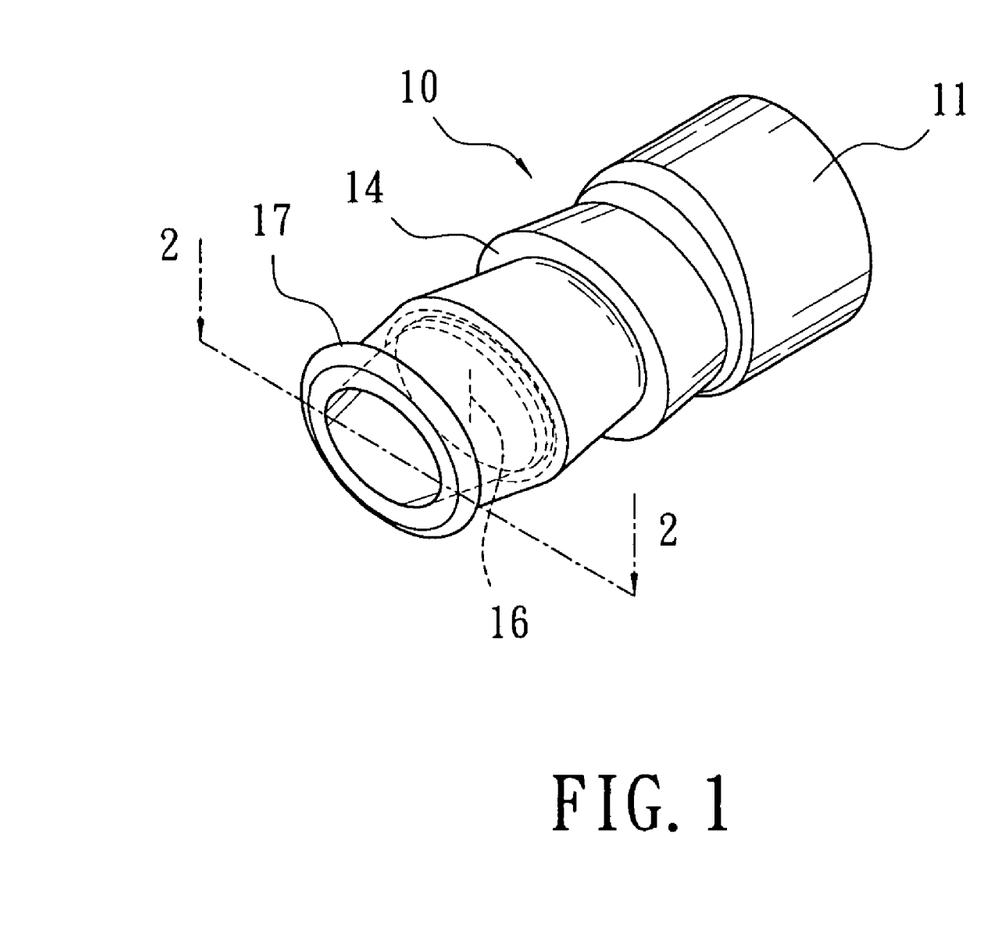
FIG. 1 shows an elevational view according to the invention.
Figure 2:
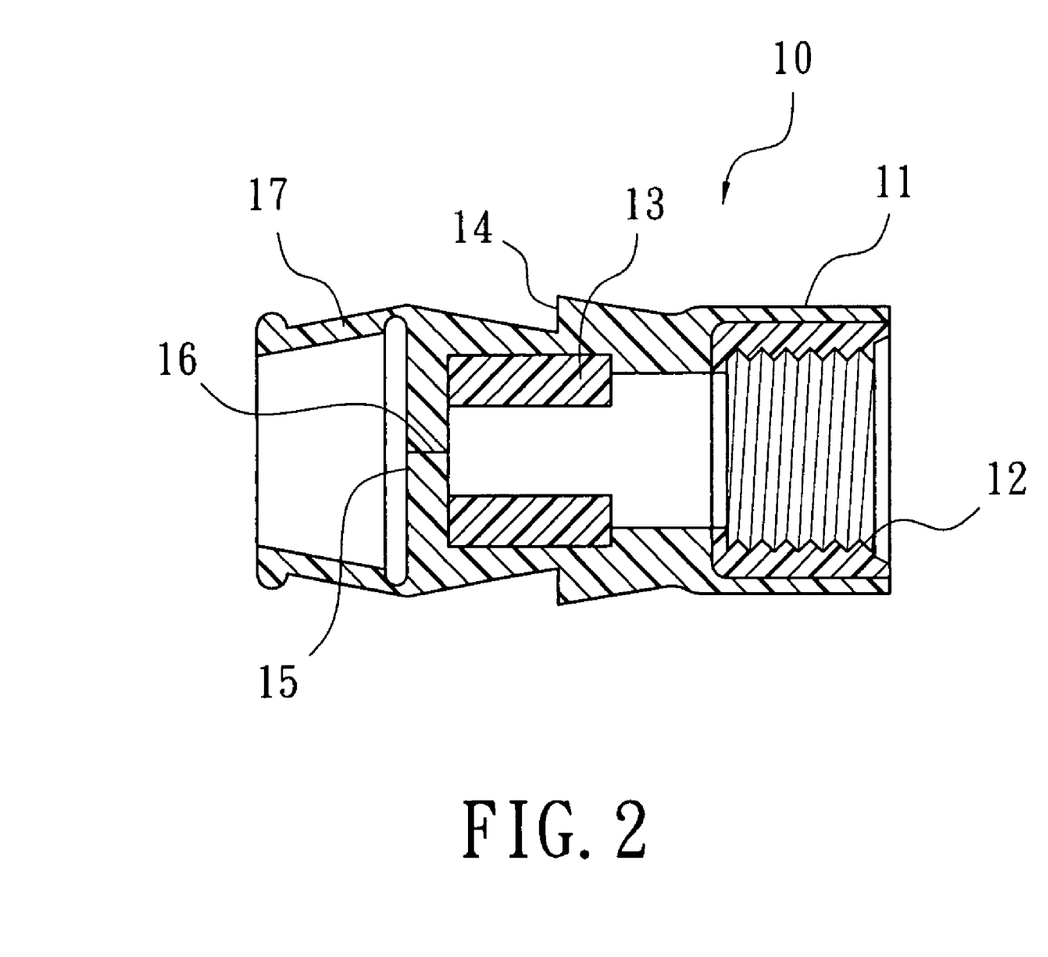
FIG. 2 shows a sectional view of FIG. 1 taken along 2-2.

Referring to FIGS. 1 and 2, a bite valve 10 according to the invention is manufactured from a soft and flexible material; and comprises a joining section 11 at a rear portion thereof, a liquid outlet section 15 at a front portion thereof, a step section 14 at the liquid outlet section 15, an inner screw thread 12 at an inner wall of the joining section 11, a liquid outlet slit 16 penetrated through a vertical wall of the liquid outlet section 15, an extension tube 17 having a specific length extended from a side of the liquid outlet section 15 and a diameter gradually contracted, at least a pair of columns 13 at an inner wall thereof. Wherein, the columns 13 are disposed in pairs and are relatively located at two sides of the liquid outlet slit 16, and the step section 14 is provided at outer sides of the columns 13. In addition, for adapting to shapes of the step section 14 of the bite valve 10, the extension tube 17 may be an equal-diameter tube or an dilated tube having an expanded diameter as long as the extension tube 17 is tightened around the liquid outlet section 15 of the bite valve 10 when bent in a backward direction.

Figure 3:
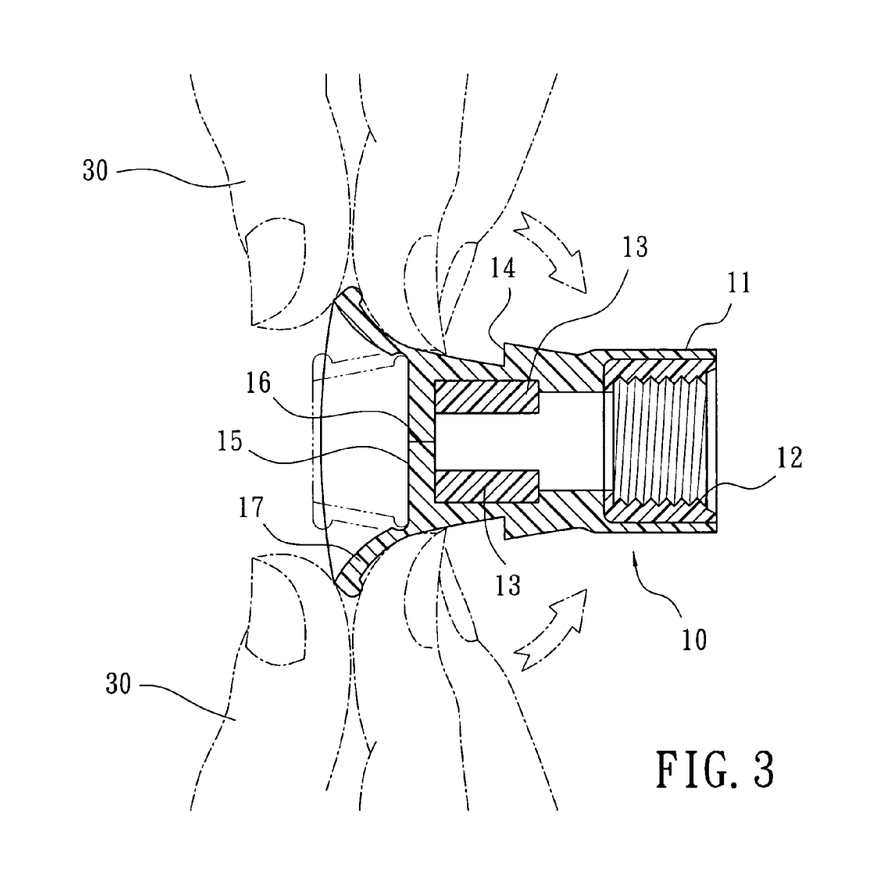
FIG. 3 shows a schematic view the extension tube being bent according to the invention.
Figure 4:
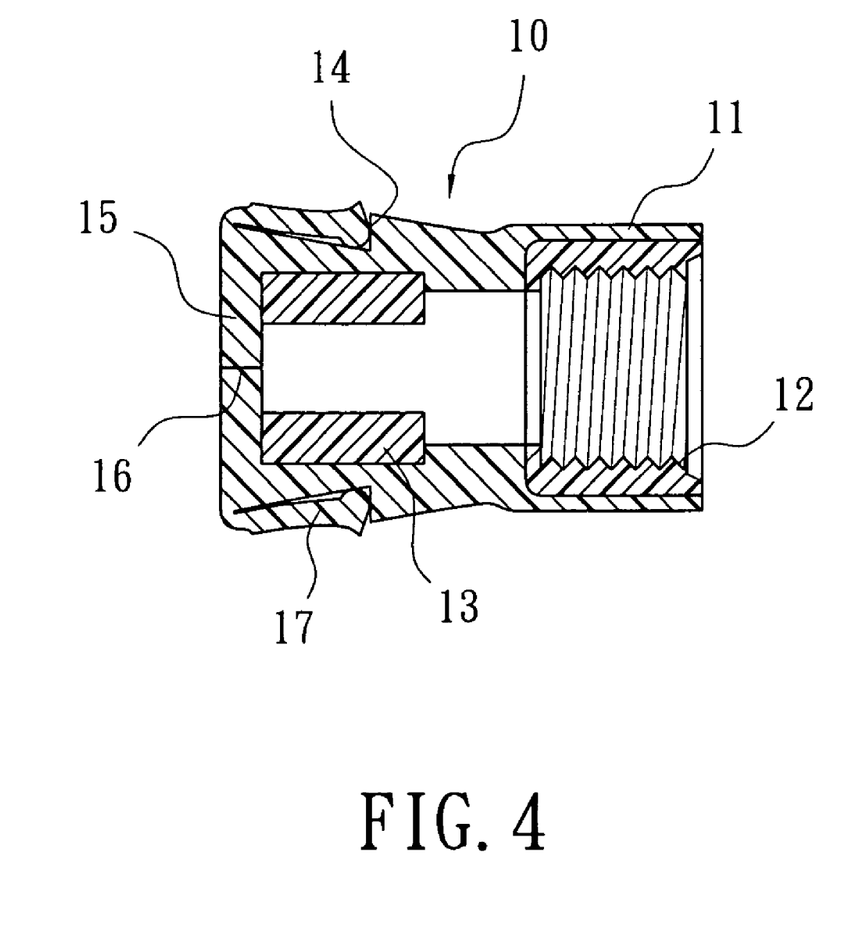
FIG. 4 shows a sectional view illustrating the extension tube in FIG. 3 already bent.
Figure 5:
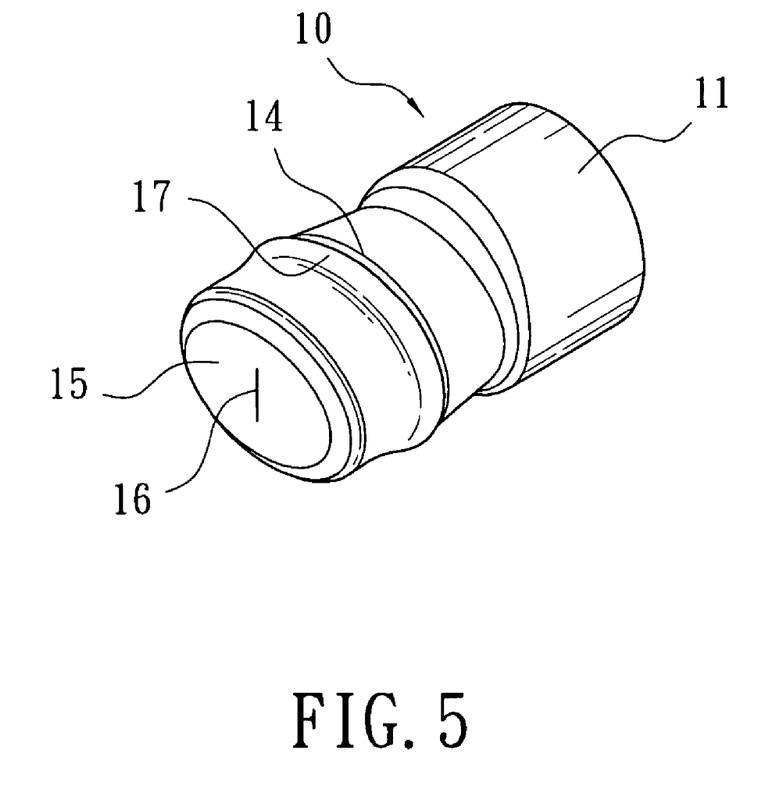
FIG. 5 shows an elevational view of FIG. 4.

Referring to FIGS. 3, 4 and 5, before putting the invention to use, a user may bend the extension tube 17 backward using a finger 30 as shown in FIG. 3, such that the extension tube 17 is exactly accommodated around the step section 14, with the liquid outlet slit 16 of the liquid outlet section 15 being exposed for facilitating dispensing a liquid contained. The bite valve 10 is screwed and fastened to a liquid guide tube (not shown) of a liquid container using the inner screw thread 12 of the joining section 11.

Figure 6:
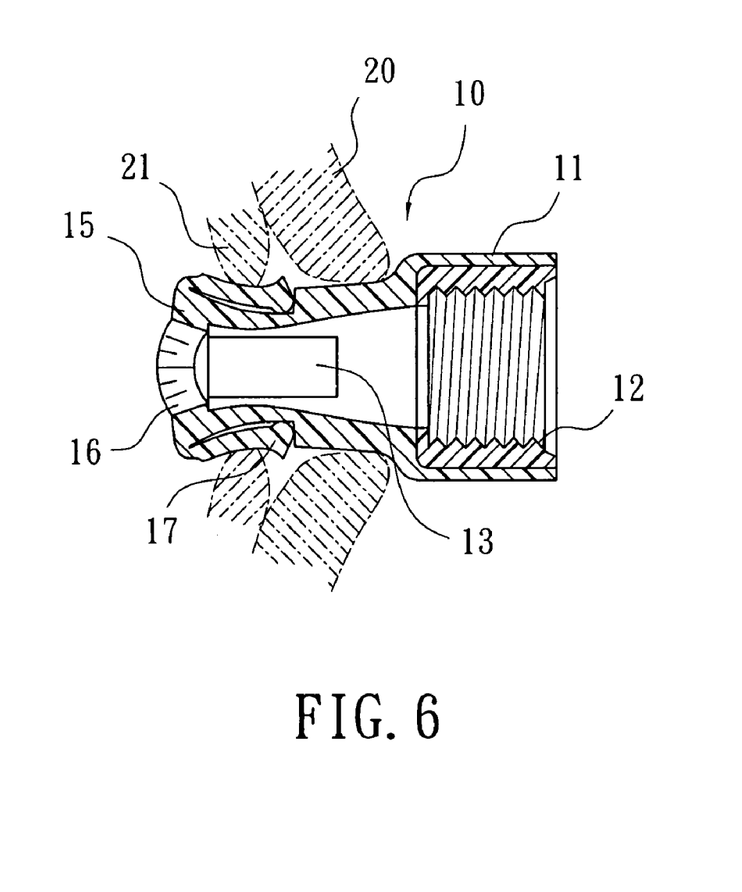
FIG. 6 shows a longitudinal sectional view illustrating the invention held between one's teeth.
Figure 7:
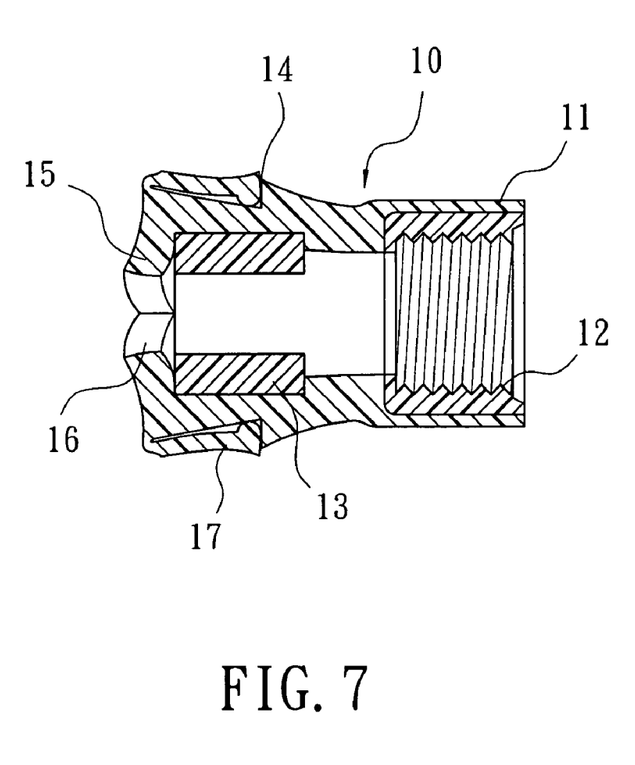
FIG. 7 shows a transverse sectional view illustrating the invention held between one's teeth.
Figure 8:
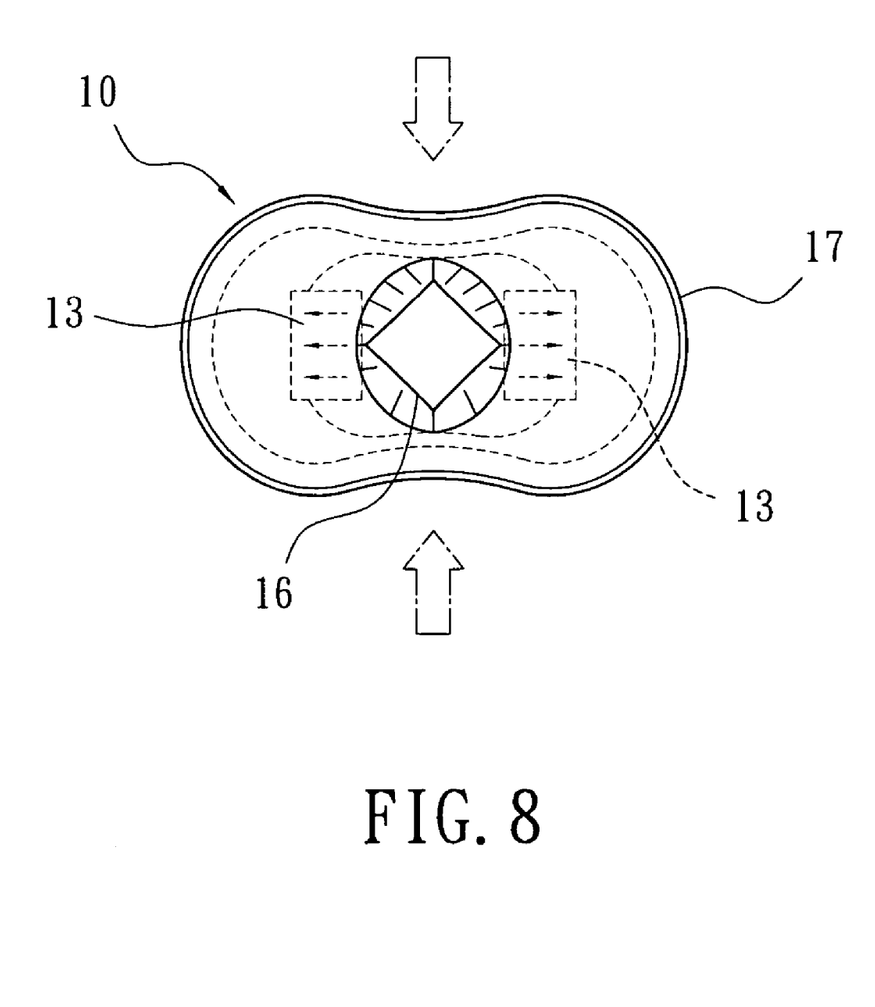
FIG. 8 shows a front view according to the invention before being compressed.

Referring to FIGS. 6, 7 and 8, to put the invention to use, the bite valve 10 is placed in one's mouth and is held between teeth 21 and lips 20. When the liquid outlet section 15 at the front portion of the bite valve 10 receives forces applied by biting from the teeth 21, for that the columns 13 relatively disposed at the left and right the inner wall of the bite valve 10 are a formed integral with the inner wall of the bite valve 10, the columns 13 at the two sides are horizontally displaced due to forces received by the bite valve 10. Thus, a vertical plate body of the liquid outlet section 15 around the liquid outlet slit 16 is forcibly stretched outward as shown in FIG. 7 when the liquid outlet slit 16 is horizontally displaced using the columns 13 at the two sides. Referring to FIG. 7 showing a top view, when the columns 13 at the left and right sides of the bite valve 10 receive vertical and downward forces, the columns 13 near the liquid outlet section 15 are expanded outward to stretch open the plate body around the liquid outlet slit 16, thereby producing extreme expanding effects of the liquid outlet to rapidly dispense the liquid contained in the liquid container in mass.

It is a common misunderstanding that an amount of the liquid dispensed gets larger when greater forces are applied to the bite valve in a downward direction, or the bite valve 10 naturally receives greater forces when applying pressure by one's mouth to withdraw the liquid contained. However, according to the invention, the columns 13 serve as supports when the teeth 21 tend to bite with excessive forces to prevent an internal channel of the bite valve from over-sagged to further keep a flow within the internal channel smooth.

When having completed application of the invention, the teeth 21 and the lips 20 are disengaged from the bite valve 10, and hence forces applied are dismissed. Using high restoring elasticity of the extension tube 17 bent around the outer periphery of the liquid outlet section 15, the vertical wall of the liquid outlet section 15 is contracted, thereby tightening the liquid outlet slit 16 to prevent leakage of the liquid in the liquid container.

Figure 9:
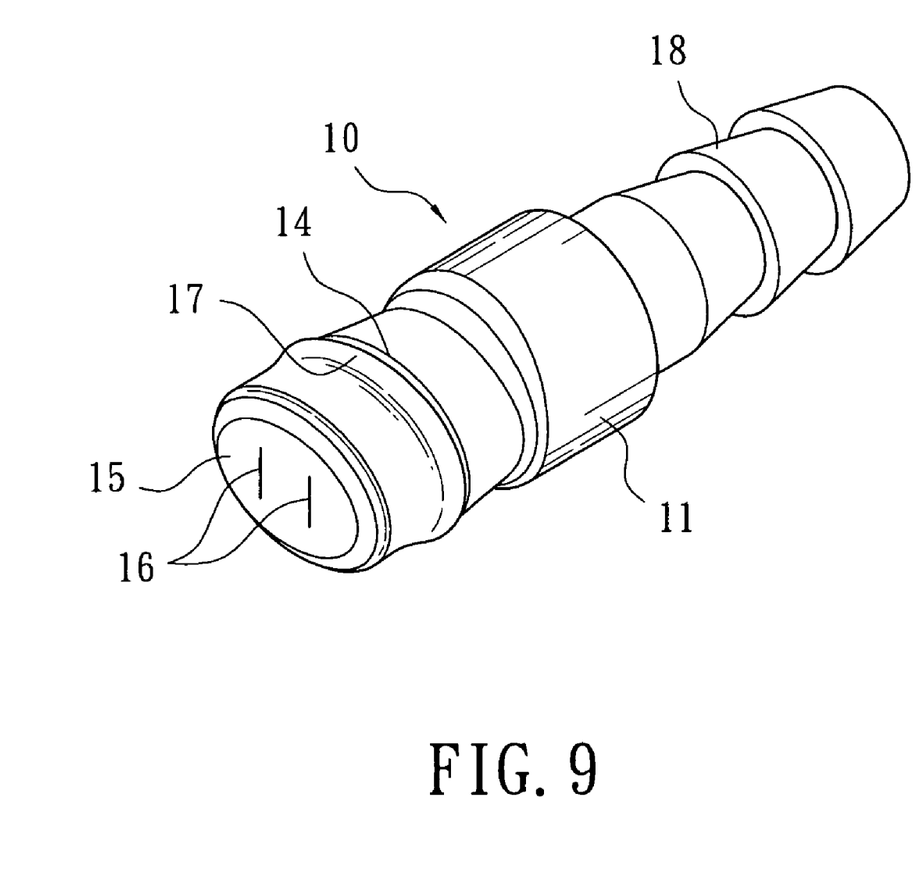
FIG. 9 shows a schematic view of another embodiment according to the invention.

Referring to FIG. 9, apart from the one liquid outlet slit 16 as in the aforesaid application, being permitted by actual dimensions of the plate body, two or more liquid outlet slits 16 may also be devised at the vertical wall of the liquid outlet section 15 between the two columns 13. Meanwhile, the inner thread 12 at the inner wall of the joining section 11 may be replaced by an insertion tube element 18 having protruding parts at an end portion thereof, such that one end the of insertion tube element 18 is enclosed and joined by the soft and flexible material of the bite valve while the other end thereof having exposed protruding parts is directly inset into the liquid guide tube of the liquid container.

It is apparent from the aforesaid descriptions that, the bite valve according to the invention has the following practical excellences:

1. The bite valve is a formed integral from a soft and flexible plastic material, and has a liquid outlet section at a front portion thereof joined with an extension tube, which is capable of bending and accommodating around an outer periphery of a liquid outlet slit, thereby providing high-intensity sealing effects.

2. The bite valve is disposed with columns at an interior thereof. When the bite valve is held between one's teeth, the columns are expanded outward to stretch the plate body around the liquid outlet slit to result in an extreme expansion effect of a liquid outlet opening, thereby allowing a liquid contain in a liquid container to be more easily dispensed.

3. The columns are disposed at inner walls of an internal channel of the bite valve and are located at two sides of the liquid outlet slit. Therefore, a sagged distance when the bite valve is held between one's teeth is effectively controlled to maintain a smooth flow within the internal channel.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A bite valve manufactured from a soft and flexible material, comprising a joining section at a rear portion thereof; a mouthpiece having a liquid outlet section at a front portion thereof; a liquid outlet slit penetrating to an interior and provided at a vertical wall of the liquid outlet section; and an extension tube projecting from an outer periphery of the liquid outlet section, and bending inward to accommodate around the outer periphery of the liquid outlet section to tightly seal the liquid outlet slit of the liquid outlet section, wherein the outer periphery of the liquid outlet section is provided with a step section locating the extension tube when the extension tube is bent and accommodated around the liquid outlet section.

2. The bite valve in accordance with claim 1, wherein, at a vertical wall of the liquid outlet section, an inner wall approaching the liquid outlet section is provided with at least a pair of columns.

3. The bite valve in accordance with claim 1, wherein a quantity of the liquid outlet slit at the vertical wall of the liquid outlet section is at least two.

4. The bite valve in accordance with claim 1, wherein the extension tube of the bite valve has a diameter thereof extended to appear as a contracted tube.

5. The bite valve in accordance with claim 1, wherein the extension tube of the bite valve has a diameter thereof extended to appear as an equal-diameter tube.

6. The bite valve in accordance with claim 1, wherein the extension tube of the bite valve has a diameter thereof extended to appear as a dilated tube.

7. The bite valve in accordance with claim 1, wherein the inner wall of the joining section is provided with an inner screw thread.

8. The bite valve in accordance with claim 1, wherein the joining section is provided with an insertion tube element.

9. A bite valve manufactured from a soft and flexible material, comprising a joining section at a rear portion thereof; a mouthpiece having a liquid outlet section at a front portion thereof; a liquid outlet slit penetrated to an interior and provided at a vertical wall of the liquid outlet section; and being characterized that, an inner wall approaching the liquid outlet section is provided with at least a pair of columns, which are fixed at the vertical wall of the liquid outlet section of the bite valve and are located at two sides of the liquid outlet slit, wherein the outer periphery of the liquid outlet section is provided with a step section locating the extension tube when the extension tube is bent and accommodated around the liquid outlet section.

10. The bite valve in accordance with claim 9, wherein a quantity of the liquid outlet slit at the vertical wall of the liquid outlet section is at least two.

11. The bite valve in accordance with claim 9, wherein the inner wall of the joining section is provided with an inner screw thread.

12. The bite valve in accordance with claim 9, wherein the joining section is provided with an insertion tube element.

13. The bite valve in accordance with claim 9, wherein an extension tube is projecting from an outer periphery of the liquid outlet section.

* * * * *